United States Patent [19]

Beckmann, Sr.

[11] Patent Number: 4,471,973
[45] Date of Patent: Sep. 18, 1984

[54] TRAILER HITCH FOR MOTORCYCLE

[76] Inventor: Gilbert R. Beckmann, Sr., Rte. 1, Box 5B, Republic, Mich. 49879

[21] Appl. No.: 435,909

[22] Filed: Oct. 22, 1982

[51] Int. Cl.³ .............................................. B60D 1/06
[52] U.S. Cl. ................................... 280/483; 280/204; 280/511
[58] Field of Search ............... 403/111, 145, 146, 164, 403/166; 280/483, 486, 511, 204, 489, 492, 493, 494; 267/58, 155

[56] References Cited

U.S. PATENT DOCUMENTS

| | | | |
|---|---|---|---|
| 2,339,155 | 1/1944 | Cusack | 280/204 |
| 2,746,771 | 5/1956 | Gross | 280/494 |
| 3,331,618 | 7/1967 | Head et al. | 280/489 X |
| 3,525,539 | 8/1970 | Illar | 280/483 |
| 4,147,375 | 4/1979 | Bangert et al. | 280/483 |
| 4,180,279 | 12/1979 | Belliveau, Sr. | 280/204 |
| 4,307,893 | 12/1981 | Ragland | 280/492 X |

Primary Examiner—Joseph F. Peters, Jr.
Assistant Examiner—Michael Mar
Attorney, Agent, or Firm—Buell, Blenko, Ziesenheim & Beck

[57] ABSTRACT

The hitch comprises a tow bar section, which is connected to the motorcycle, and a tongue section, which is connected to the trailer. The two sections are connected by a swivel which permits rotation therebetween about their common longitudinal axis. Between the tow bar and the tongue is connected a pair of torsion springs which oppose rotation between tow bar and tongue.

6 Claims, 4 Drawing Figures

TRAILER HITCH FOR MOTORCYCLE

This invention relates to a hitch for towing a trailer behind a motorcycle. It is more particularly concerned with such a hitch which minimizes damage to hitch and motorcycle should the motorcycle happen to turn over while attached to the trailer.

BACKGROUND OF THE INVENTION

It not infrequently happens that the owner of a motorcycle wishes to transport more baggage than the motorcycle will accommodate. Various hitches for towing a two-wheeled trailer behind a motorcycle are available, but none of them known to me is free from risk in regard to turnover of the towing motorcycle. When a motorcycle is parked on dirt or soft blacktop it may happen that the motorcycle stand will settle into the soft dirt or blacktop and the motorcycle will fall over. A sharp turn of the towing motorcycle, or a bad rut or pothole in the road, may cause the front wheel of the motorcycle to pivot to such an extent that the motorcycle topples over. When a motorcycle hitched to a trailer turns over, that action may damage the hitch, or twist the trailer tongue so that the motorcycle cannot readily be freed therefrom.

SUMMARY OF THE INVENTION

My hitch, to be described thereinafter, comprises a tow bar, which is attached to a towing motorcycle in the conventional way, and a tongue, which is attached to the trailer in any convenient way, the tow bar and the tongue being connected by a swivel joint which permits rotation therebetween around the common longitudinal axis of the two. Between the tow bar and tongue is connected a torsion spring, or preferably two such springs, which resist this rotation by coiling. In the event that a motorcycle hitched to a trailer by the hitch of my invention tends to topple over, the spring or springs resist this toppling, but if their resistance is overcome the springs absorb the twist, which would otherwise damage a unitary tow bar, so that the hitch is not damaged and the motorcycle can be freed therefrom without difficulty. My hitch also facilitates the towing of a trailer by a motorcycle in that it permits the towing motorcycle to lean to one side or the other on curves.

DESCRIPTION OF PREFERRED EMBODIMENT

Figure 1:
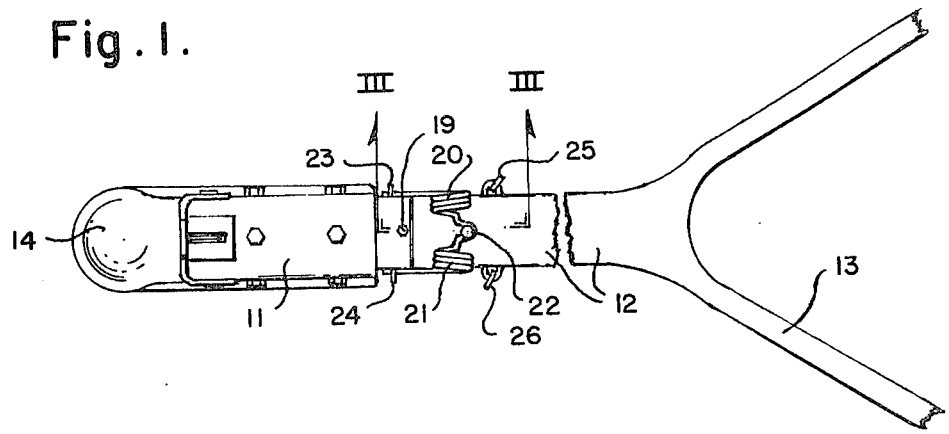
FIG. 1 is a partial plan of my hitch.
Figure 2:
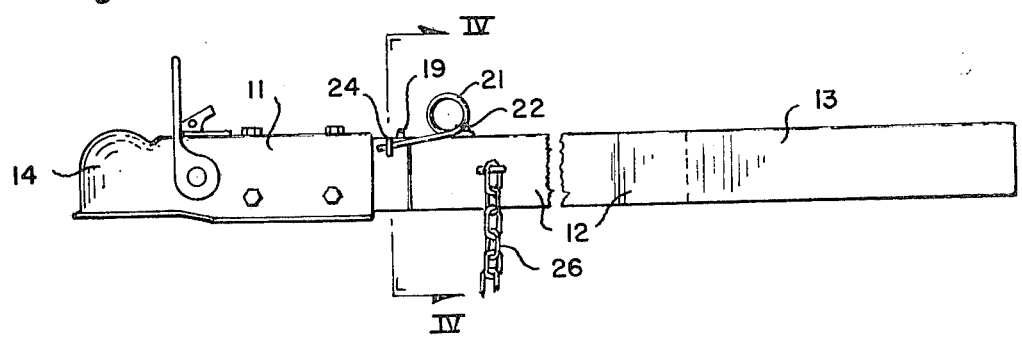
FIG. 2 is a partial elevation of my hitch.
Figure 3:
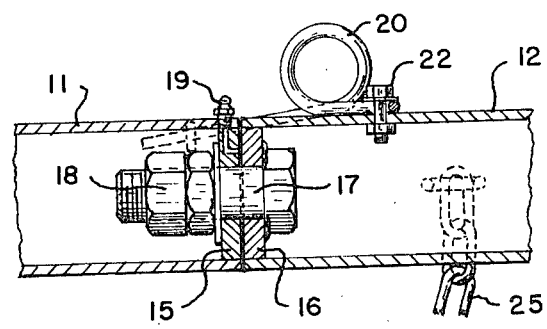
FIG. 3 is a longitudinal cross section taken on the plane III—III of FIG. 1.

My hitch comprises a tow bar section 11 connected to a tongue section 12 which, in turn, is affixed to a member 13 which is attached at its ends to a two wheeled trailer by any convenient means. Tow bar section 11 is fitted at its front or outside end with a connector 14 for a conventional ball-and-socket hitch connector. Tow bar section 11 and tongue section 12 are hollow, preferably of square or rectangular section, and at their abutting ends are closed with end plates 15 and 16 respectively, as shown in FIG. 3. Those end plates are connected so as to swivel on each other by a bolt 17, the head of which is preferably welded to plate 16, and a locknut 18, or a nut and jam nut. A grease fitting 19 is provided at the swivel joint so as to permit lubrication thereof.

Figure 4:
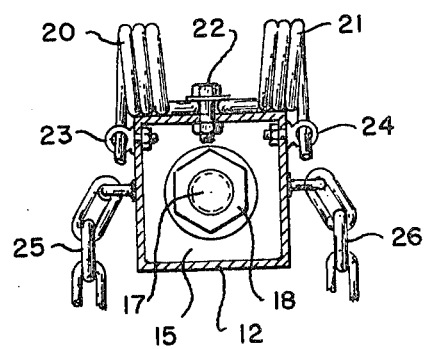
FIG. 4 is a transverse cross section taken on the plane IV—IV of FIG. 2.

On the top face of tongue section 12 are fixed coil springs 20 and 21 end-to-end cross-wise of the tongue, as shown in FIG. 4. Springs 20 and 21 are coiled in opposite directions. The inside ends of the springs are attached to the top face of tongue section 12 with a bolt 22. The outside ends of springs 20 and 21 are straightened and attached to opposite sides of the tow bar section 11 by bolts 23 and 24, respectively, as are shown in FIG. 4. Conventional safety chains 25 and 26 are attached at adjoining ends to tongue section 12, and at their other ends to convenient points on the towing motorcycle.

Springs 20 and 21 are torsion springs. Bolt 17 is a pivot which permits tow bar section 11 and tongue section 12 to rotate with respect to each other about bolt 17, which is located on the common longitudinal axis of the tow bar and tongue sections. That rotation is opposed by springs 20 and 21, which thus tend to keep the towing motorcycle and trailer aligned. If, however, the towing motorcycle should turn over, tow bar section 11 and everything attached to it would rotate about bolt 17 with respect to tongue section 12, winding up torsion springs 20 and 21. Thus my hitch will not be damaged, and will permit the motorcycle to be righted.

It is not essential that my torsion springs be positioned on the top face of the tongue section. They can be fixed on the bottom face or a side face, either of the tongue section or tow bar section of my hitch. While I prefer to use coil springs for my torsion elements, other torsion elements, such as bars, tubes, etc., can be used for that purpose.

I claim:

1. In a hitch for towing a trailer behind a motorcycle, the hitch having a tow bar connected with the towing motorcycle and with means attached to the trailer, the improvement comprising a tongue affixed to the means attached to the trailer, the front end of the tongue being joined to the rear end of the tow bar by swivel means permitting rotation of the tongue with respect to the tow bar about their common longitudinal axis and a torsion coil spring having a central axis and two ends, one end of said spring being attached to the rear end of the tow bar and the other end of the spring being attached to the front end of the tongue so as to position the central axis of the spring transverse to the common longitudinal axis of the tow bar and tongue, said spring biasing said tow bar and said tongue to a neutral towing position while permitting rotation therebetween.

2. The hitch of claim 1 in which the torsion spring is a first torsion spring and including a second torsion spring axially aligned with the first torsion spring and coiled in the opposite direction to the first torsion spring, with its end adjacent an end of the first torsion spring connected with that end and its other end connected with the other end of the first torsion spring.

3. The hitch of claim 1 in which the torsion spring is positioned rearward of the swivel means.

4. The hitch of claim 2 in which the torsion springs are positioned above the tongue.

5. The hitch of claim 4 in which the tongue has a flat upper surface and the adjoining ends of the torsion springs are affixed to that upper surface.

6. The hitch of claim 4 in which the tow bar has sides and the other ends of the torsion springs are affixed to sides of the tow bar.

* * * * *